(12) United States Patent
Harfst et al.

(10) Patent No.: US 9,757,808 B2
(45) Date of Patent: Sep. 12, 2017

(54) FORMED WIRE TIE STRAP WITH INTEGRATED RIVET FOR A SAW CHAIN

(71) Applicant: BLOUNT, INC., Portland, OR (US)

(72) Inventors: Michael D. Harfst, Milwaukie, OR (US); Christopher D. Seigneur, West Linn, OR (US)

(73) Assignee: Blount, Inc., Portland, OR (US)

( * ) Notice: Subject to any disclaimer, the term of this patent is extended or adjusted under 35 U.S.C. 154(b) by 687 days.

(21) Appl. No.: 13/829,184

(22) Filed: Mar. 14, 2013

(65) Prior Publication Data

US 2014/0260875 A1    Sep. 18, 2014

(51) Int. Cl.
| | |
|---|---|
| *B27B 33/02* | (2006.01) |
| *B23D 65/00* | (2006.01) |
| *B27B 33/14* | (2006.01) |
| *B21L 9/00* | (2006.01) |

(52) U.S. Cl.
CPC .............. *B23D 65/00* (2013.01); *B27B 33/14* (2013.01); *B21L 9/00* (2013.01); *Y10T 83/909* (2015.04)

(58) Field of Classification Search
CPC ..... Y10T 83/909; Y10T 83/913; B23D 65/00; B21L 9/02; B21L 9/04; B21L 9/06; B21L 11/10; B21L 13/00; B21L 99/005; B27B 33/14
USPC ...................................... 59/8, 18, 23; 83/830
See application file for complete search history.

(56) References Cited

U.S. PATENT DOCUMENTS

| | | | | |
|---|---|---|---|---|
| 926,170 | A * | 6/1909 | Campbell | B21K 1/46 |
| | | | | 470/137 |
| 1,437,918 | A * | 12/1922 | Smith | B21K 1/74 |
| | | | | 29/34 D |
| 2,648,989 | A * | 8/1953 | Cordis | A01K 1/0128 |
| | | | | 198/730 |
| 3,410,084 | A * | 11/1968 | Cain | B21L 9/04 |
| | | | | 59/16 |
| 3,421,313 | A | 1/1969 | Harada | |
| 3,931,706 | A | 1/1976 | McKeon | |
| 4,037,403 | A * | 7/1977 | Lanz | B21L 9/00 |
| | | | | 59/35.1 |
| 4,118,995 | A | 10/1978 | Lanz | |
| 5,404,707 | A * | 4/1995 | Suzuki | B21K 1/74 |
| | | | | 59/71 |
| 7,293,491 | B2 | 11/2007 | Harfst | |

(Continued)

FOREIGN PATENT DOCUMENTS

| | | |
|---|---|---|
| DE | 2539445 | 7/1976 |
| GB | 2109455 A | 5/1983 |

*Primary Examiner* — Kenneth E. Peterson
*Assistant Examiner* — Samuel A Davies
(74) *Attorney, Agent, or Firm* — Schwabe Williamson & Wyatt, P.C.

(57) ABSTRACT

Embodiments herein provide formed wire tie strap for a saw chain. Embodiments also provide a saw chain including one or more formed wire tie straps. The formed wire tie strap may include a body with one or more integrated rivets extending from the body. In some embodiments, the body may be substantially flat. The rivet may include a rivet head configured to engage a rivet hole of an opposing tie strap and a shoulder configured to engage a rivet hole of a connecting link, such as a drive link. Some embodiments of the formed wire tie strap may include a pair of integrated rivets extending from the body. Some embodiments may include a rivet hole disposed in the body of the formed wire tie strap.

9 Claims, 12 Drawing Sheets

(56) References Cited

U.S. PATENT DOCUMENTS

2007/0124946 A1 6/2007 Seigneur
2008/0110317 A1 5/2008 Osborne

* cited by examiner

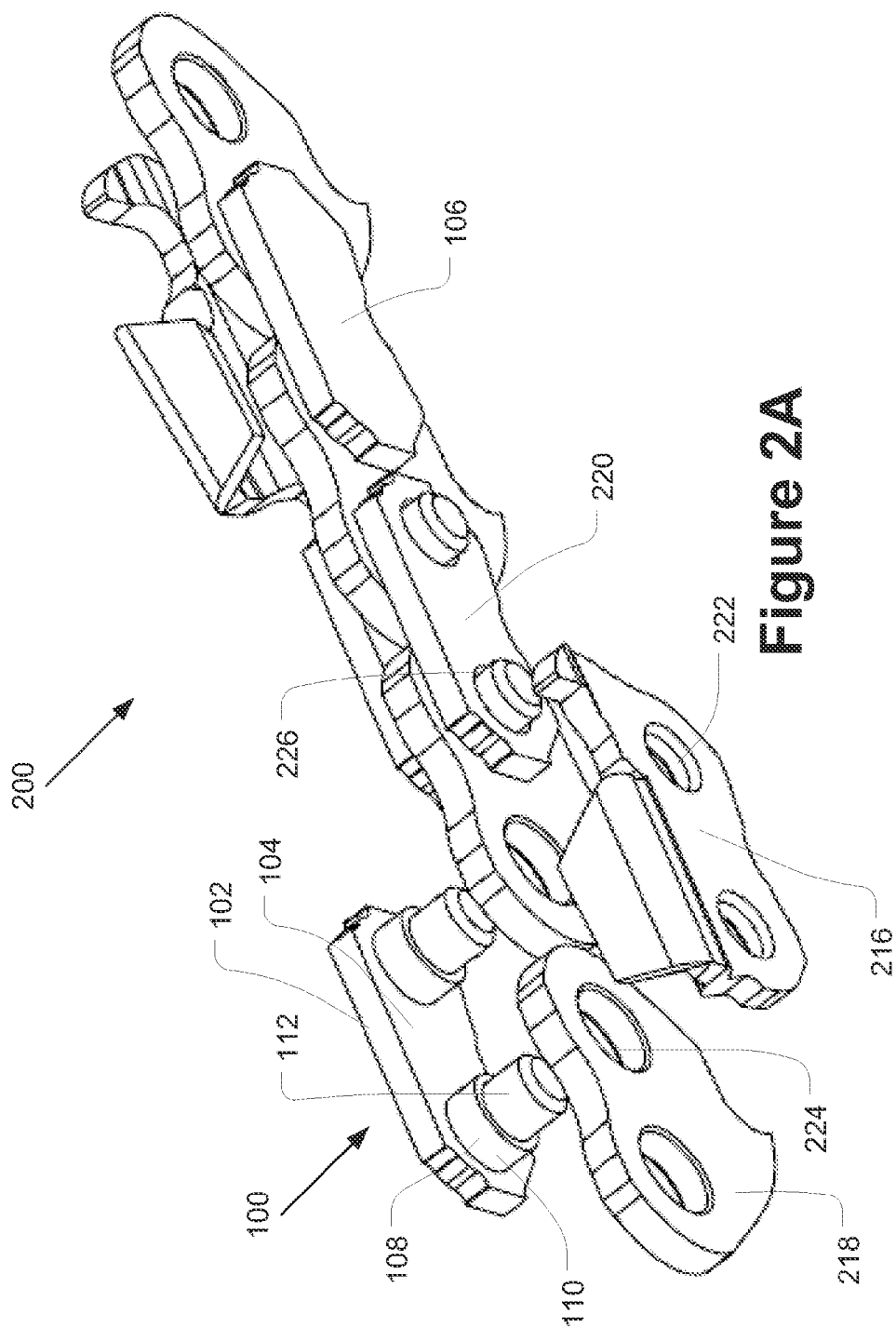

FORMED WIRE TIE STRAP WITH INTEGRATED RIVET FOR A SAW CHAIN

TECHNICAL FIELD

Embodiments herein relate to the field of saw chains, and, more specifically, to a formed wire tie strap with integrated rivet for a saw chain.

BACKGROUND

Saw chains for chainsaws typically include a plurality of links, such as cutter links, drive links, and tie straps, coupled to one another by rivets. The rivets must be manufactured separately from the links, and the link manufacturing process produces a large amount of scrap material. Additionally, the rivets can come loose during operation of the saw chain. Furthermore, for small saw chains, the small rivets and links can be difficult to manipulate.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 2A illustrates a partial exploded view of a saw chain including the formed wire tie strap of FIG. 1A, in accordance with various embodiments;

DETAILED DESCRIPTION OF DISCLOSED EMBODIMENTS

Figure 1A:
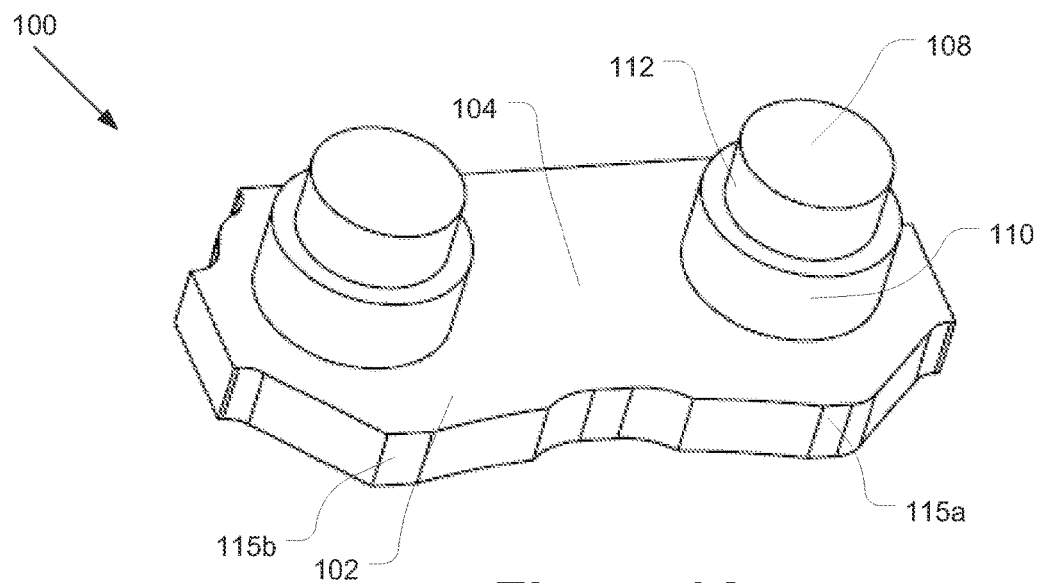
FIG. 1A illustrates a perspective view of a formed wire tie strap with integrated rivets in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide an apparatus, system, and method for a formed wire tie strap with one or more integrated rivets. Embodiments further provide a saw chain that includes a plurality of links, including one or more formed wire tie straps, coupled to one another. The formed wire tie strap may include a body portion (also referred to as tie strap portion) that has a length configured to couple adjacent links, such as drive links, of a saw chain to one another. The formed wire tie strap may further include one or two rivets that extend from the body of the tie strap. The rivets may be configured to be disposed in and/or engage with a rivet hole of a connecting link (e.g., a drive link) to couple the connecting link to another link. In some embodiments, the rivets may further couple the formed wire tie strap to an opposing tie strap on the other side of the connecting link. In various embodiments, the body and one or more rivets may be formed from a portion of wire, such as steel wire. For example, the formed wire tie strap with one or more integrated rivets may be formed from a single piece of wire.

In various embodiments, saw chain may be configured to be driven on a guide bar of a chain saw. The guide bar may extend from a body of the chain saw and may generally include a pair of parallel straight portions running from a proximal end of the guide bar (closer to the body) to a distal end of the guide bar (further from the body). In some embodiments, the straight portion may include a pair of rails, with a groove disposed between the rails.

The guide bar may further include a sprocket at the proximal and/or distal end to drive the saw chain around the ends of the guide bar. For example, the guide bar may include a drive sprocket at the proximal end of the guide bar and a nose sprocket at the distal end of the guide bar. The sprocket may include a spur with a plurality of pockets to engage respective links of the saw chain. In some embodiments, the sprocket may further include a pair of rims with outer edges that define rails. The spur may be sandwiched between the pair of rims. Other embodiments of the sprocket may not include rims.

In various embodiments, the saw chain may include a plurality of links coupled to one another in a chain. For example, the saw chain may include one or more cutter links, drive links, and/or tie straps. The cutter links may include a sharpened cutting edge for cutting a workpiece (e.g., wood). In some embodiments, the cutter links may further include a depth gauge to control a depth of cut of the cutter link. For example, the depth gauge may be disposed in front of the cutting element (e.g., in the direction of travel of the saw chain).

In some embodiments, the cutter links may be integrated into a tie strap. Such a link may be referred to as a cutter tie strap. In some embodiments, the cutter tie strap may be a formed wire tie strap as described herein. The cutter tie strap may be a side link configured to ride on a left or right rail of the guide bar.

In various embodiments, the drive links may be center links configured for riding in the groove of the guide bar and/or to engage with one or more sprockets of the guide bar. For example, the drive links may include a tang that extends downward from a body of the drive link to ride in the groove of the guide bar and/or engage a pocket of the sprocket.

Additionally, or alternatively, some embodiments may provide a saw chain including cutter links integrated into a drive link. Such a link may be referred to as a cutter drive link. The cutter drive link may include a body with a tang extending downward from the body, and a cutting element and depth gauge extending upward from the body. Some embodiments may provide a saw chain including a plurality of cutter drive links coupled to one another by formed wire tie straps with integrated rivets. In some embodiments, the saw chain may include only cutter drive links and tie straps, and some or all of the tie straps may be formed wire tie straps as described herein.

In various embodiments, the formed wire tie strap may be formed from a portion of wire, such as steel wire. As discussed above, the tie strap may include a body and at least one rivet extending from the body. The body may include an outer surface and an inner surface. The outer surface may generally face away from a connecting link to which the tie strap is coupled, and the inner surface may generally face the connecting link. The one or more rivets may extend from the inner surface. In some embodiments, the body may be substantially flat. For example, the outer surface and/or inner surface of the body may be substantially flat (e.g., planar). In some embodiments, the outer surface and inner surface may be substantially parallel to one another. The substantially flat body may allow a larger diameter (e.g., cross section) wire to be used to form the formed wire tie strap without increasing the kerf width of the saw chain. That is, the flat body may reduce the distance that the tie strap extends from the side of the connecting link compared with a wire tie strap including a rounded body. Additionally, or alternatively, the substantially flat body may provide an enhanced appearance of strength to the user. The flat body may be formed by any suitable process, such as by stamping the body portion of the wire.

The formed wire tie strap may further include a pair of foot portions on a bottom surface of the body. The foot portions may contact the rail as the tie strap traverses the guide bar. The foot portions may be separated on the bottom surface of the body or may be included in a continuous portion of the bottom surface.

In some embodiments, the formed wire tie strap may further include a second pair of foot portions on a top surface of the body. This may allow the formed wire tie strap to be reversible. In a first orientation of the formed wire tie strap, the foot portions on the bottom surface of the body may contact the rail, and in a second orientation of the formed wire tie strap, the foot portions on the top surface of the body may contact the rail. This may allow the same design of formed wire tie strap to be used for both left and right tie straps.

As discussed above, embodiments of the formed wire tie strap may include one or two integrated rivets. In embodiments of the formed wire tie strap with two integrated rivets, the rivets may be spaced apart on the body. For example, the rivets may extend from first and second ends of the body. The rivets may extend through respective rivet holes of two different connecting links to couple the connecting links to one another. The connecting links may be center links, such as drive links, in some embodiments. An opposing tie strap with a pair of rivet holes may be disposed on the other side of the connecting links, and the rivets may engage with the rivet holes of the opposing tie strap.

In embodiments in which the formed wire tie strap has only one integrated rivet, the formed wire tie strap may additionally include a rivet hole in the body. For example, the formed wire tie strap may include an integrated rivet extending from a first end of the body and a rivet hole disposed in a second end of the body. Another formed wire tie strap with one integrated rivet and one rivet hole may be used as the opposing tie strap in these embodiments.

For example, the integrated rivet of a first formed wire tie strap may extend through a rivet hole of a first connecting link and engage with a rivet hole of a second formed wire tie strap on the other side of the first connecting link. The integrated rivet of the second formed wire tie strap may extend through a rivet hole of a second connecting link and engage with the rivet hole of the first formed wire tie strap. Accordingly, in these embodiments, two formed wire tie straps may be used to couple two connecting links to one another. The two formed wire tie straps may be of the same design and/or may be mirror images of one another. Using formed wire tie straps of the same design may facilitate manufacturing and/or assembly of the saw chain.

As discussed above, in some embodiments, the formed wire tie strap may be a formed wire cutter tie strap. The formed wire cutter tie strap may include a sharpened cutting element that extends upward from the body. The formed wire cutter tie strap may further include a depth gauge that extends upward from the body in front of the cutting element. The formed wire cutter tie strap may be a left side cutter link or a right side cutter link.

In various embodiments, the integrated rivet of the formed wire tie strap may include a shoulder and a hub. The shoulder may be configured to be disposed in the rivet hole of the connecting link (e.g., drive link). The hub may be configured to be disposed in the rivet hole of the opposing tie strap. In various embodiments, the shoulder may provide a gap between the opposing tie straps to provide clearance for the connecting links between the tie straps. In some embodiments, a radius of the shoulder may be greater than a radius of the hub (e.g., as measured from a common center line) to facilitate the gap. For example, the radius of the shoulder may be greater than a radius of the rivet hole in the opposing tie strap. In some embodiments, the radius of the shoulder may be greater than the radius of the hub over only part of the outer surface of the rivet.

In some embodiments, a cross-section of the hub and/or shoulder of the rivet may be a partial circle (e.g., a semi-circle or ¾ circle). This shape may reduce the weight of the formed wire tie strap, reduce the material used by the formed wire tie strap, and/or facilitate manufacturing of the formed wire tie strap, while still facilitating rotation of the connecting link with respect to the rivet.

In some embodiments, the rivet may include a rivet head disposed at a distal end of the hub. The rivet head may have a greater radius than the hub. The rivet head may facilitate engagement of the rivet (e.g., hub) with the rivet hole of the opposing tie strap to hold the tie straps coupled together. The rivet head may help to resist tensile forces (e.g., from cutting loads) that may otherwise pull apart the rivet heads.

The rivet may further be subjected to torque (e.g., from the drive links). In prior rivets (e.g., rivets that are separate pieces from the tie straps), the torque may cause the rivets to turn inside the rivet holes of the tie straps (e.g., rotate relative to the tie strap). Over time, the turning of the rivet heads may cause the rivet to disengage with the rivet hole of the tie strap. However, the formed wire tie strap with integrated rivets may prevent the rivet from rotating relative to the opposing tie strap, since the rivet is rigidly coupled to the body of the formed wire tie strap and the opposing tie straps may rotate together. This may provide increased durability and/or reduced failure for the saw chain compared with saw chains including conventional rivets.

In some embodiments, the rivet head may be formed by spinning the hub, such as by a spinning anvil. This may shape the end of the hub to form a rivet head. The spinning may cause the distal end of the hub to swell to form the rivet head.

In other embodiments, the rivet may include a dimpled head. For example, the rivet may include a concavity in the end of the rivet to form the rivet head. In some embodiments, the concavity may form a through hole through the formed wire tie strap (e.g., there may be an opening from the end of the rivet through the body of the formed wire tie strap). In other embodiments, the concavity may not extend all the way through the rivet. The concavity may provide a strike hole, and the end of the rivet may be struck with an implement in the strike hole to spread the end of the rivet. This spreading may form the rivet head to facilitate engagement of the rivet head with the rivet hole of the opposing tie strap.

In other embodiments, the rivet head may be a crushed head. In yet other embodiments, the rivet head may be a flush head that has a same or similar radius to the hub. The flush head may be joined to the rivet hole of the opposing tie strap, such as by resistance welding, laser welding, ion-beam welding, or another non-mechanical joining process. The formed wire tie strap with integrated rivets may provide flexibility for rivet head formation that was not possible or practical with conventional rivets.

Additionally, conventional rivets are typically cylindrical, with the hub concentric with the shoulder of the rivet. This facilitates assembly of the saw chain, since the rivet does not need to be specifically oriented. However, the rivets of the formed wire tie strap have a fixed orientation with respect to the tie strap portion (body), which allows a wider range of rivet designs to be used. For example, in some embodiments, the hub and/or shoulder of the rivet may have a non-circular cross-section. For example, the shoulder and/or hub may be elliptical, football-shaped, or include multiple lobes (e.g., three lobes). Additionally, or alternatively, the hub may have a differently shaped cross-section from the shoulder. Furthermore, in some embodiments, the hub may not be concentric with the shoulder.

In some embodiments, the formed wire tie strap may be a loop join link configured to join the saw chain into a loop. In some embodiments, the loop of the saw chain may be completed in the field or at a retailer/dealer. With standard loop join presets and topping tie straps, the two heads that are spun in the field or at the retailer/dealer may be insufficient and/or may promote early loosening of the loop join. With the integrated rivets of the formed wire loop join link as described herein, less dependence may be placed on the heads of the opposing tie strap, thereby increasing strength and reducing chance of failure of the saw chain.

In some embodiments, the formed wire loop join link may be a master link configured to allow assembly and disassembly of the saw chain loop in the field (e.g., for servicing). For example, the master link may include a grooved hub with a snap ring configured to be releasably engaged with the opposing tie strap.

In various embodiments, the wire used to make the formed wire tie strap may be any suitable shape, such as substantially cylindrical or a flat strip. In some embodiments, the wire used to make the formed wire tie strap may have a starting diameter that is substantially equal to the diameter of the hub. For example, the starting diameter of the wire may be sized to be approximately equal to, or smaller than, the diameter of the corresponding rivet hole in the opposing tie strap. This may facilitate fabrication of the formed wire tie strap with little or no scrap material (e.g., waste).

The formed wire tie strap may be formed from the wire through a series of operations. The process may produce no or minimal scrap material in some embodiments. For example, in one embodiment, the wire may be cut to a desired length. A body portion of the wire may be flattened to form the body of the formed wire tie strap. One or two end portions of the wire may be bent (e.g., to about 90 degrees with respect to the body). The end portions may be shaped to form the rivets. For example, the proximal portion of the end portion may be axially struck to form the shoulder. In some embodiments, the distal portion of the end portion may be expanded to form the rivet head. For example, the hub may be spun or crushed and/or a concavity may be formed in the end of the hub and struck as described above.

As discussed above, the formed wire tie strap may include one or two integrated rivets. In embodiments in which the formed wire tie strap includes two integrated rivets, the tie strap may include a pair of end portions on either side of the body portion. Both end portions may be bent relative to the body portion and formed into rivets. In embodiments in which the formed wire tie strap includes one rivet and one rivet hole, the tie strap may include one end portion adjacent to the body portion. The end portion may be bent relative to the body portion and formed into a rivet. A rivet hole may be formed (e.g., drilled) in the other end of the body portion.

Some embodiments may include treating one or more portions of the formed wire tie strap to a specific hardness (e.g., by heat treating, carburizing, and/or austempering). The one or more portions may be hardness treated during or after shaping the formed wire tie strap.

For example, in one embodiment, the formed wire tie strap may be treated to a hardness of about Rockwell C scale (Rc) 49 to Rc 56 (e.g., Rc 53). In some such embodiments, the hubs of the rivets may not include heads, and the hubs may be welded to the opposing tie strap upon assembly of the saw chain. This may provide a simple, low-cost manufacturing process, but may result in a saw chain with a shorter usable life than other designs or manufacturing processes.

In another embodiment, the formed wire tie strap may be treated to a first hardness, such as about Rc 30 to Rc 40 (e.g., Rc 35). The treatment to the first hardness may be performed by, for example, heat treating, carburizing, and/or austempering the formed wire tie strap. The shoulder of the rivet may then be treated to a second hardness that is harder than the first hardness. For example, the second hardness may be about Rc 56 to about Rc 62. That may leave the body and hub of the formed wire tie strap at the first hardness. The lower hardness of the hub compared with the shoulder may facilitate formation of the rivet head.

In some embodiments, the foot portions of the formed wire rivets may also be treated to a third hardness. The third hardness may be approximately equal to the second hardness in some embodiments. The formed wire rivet may then be assembled with the other links of the saw chain, and the ends of the rivets may be expanded (e.g., by spinning) to form rivet heads. This process may produce a saw chain with a longer life than the process described in the preceding paragraph.

In yet another embodiment, a pair of formed wire tie strap with one integrated rivet and one rivet hole may be formed. The body may be heat treated to a first hardness, such as about Rc 30 to Rc 40 (e.g., Rc 35). The shoulder may be hardened to a second hardness that is harder than the first hardness (e.g., about Rc 56 to about Rc 62). The shoulder may be treated to the second hardness, for example, by induction hardening. The bottom surface (e.g., foot portions) of the tie straps may be hardened to a third hardness that may be equal to or less than the second hardness and greater than the first hardness. For example, the third hardness may be about Rc 49 to Rc 56 (e.g., Rc 53) in some embodiments. In some embodiments, foot portions on the top surface of the tie strap may also be hardened to the third hardness. This may allow the formed wire tie strap to be reversed to be used for both opposing tie straps.

The formed wire tie strap may then be assembled with another formed wire tie strap (e.g., with connecting links disposed between them). The ends of the rivets may be expanded to form rivet heads (e.g., by spinning, crushing, or striking) and/or the ends may be welded to the opposing tie strap.

Figure 1B:
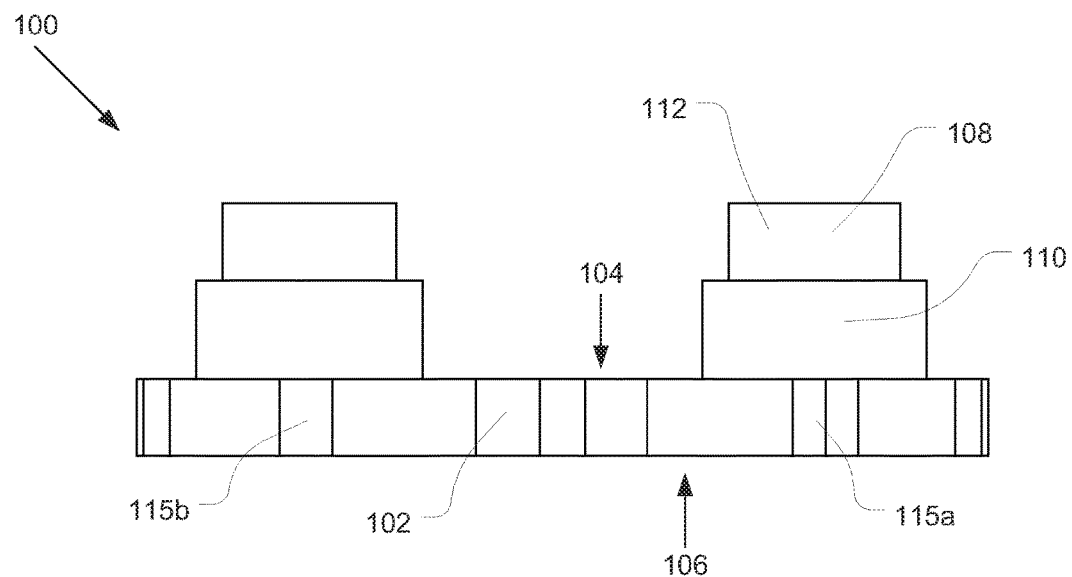
FIG. 1B illustrates a bottom view of the formed wire tie strap of FIG. 1A, in accordance with various embodiments.

FIGS. 1A and 1B illustrate views of a formed wire tie strap 100 in accordance with various embodiments. Formed wire tie strap 100 includes a body 102 having a first side 104 and second side 106 that are substantially flat. The formed wire tie strap 100 further includes two integrated rivets 108 extending from the first side 104 of the body 102. The rivets 108 include a shoulder 110 and a hub 112. The shoulder 110 is disposed between the body 102 and the hub 112, and has a diameter that is larger than a diameter of the hub.

The formed wire rivet 100 further includes foot portions 115a-b that are configured to ride on a rail of a guide bar (not shown).

In some embodiments, the formed wire rivet 100 may be treated to have portions of different hardnesses. For example, in one embodiment, the body 102 may be treated to a first hardness, such as about Rc 30 to Rc 40 (e.g., Rc 35). The shoulders 110 may be treated to a second hardness, such as about RC 56 to RC 62. In some embodiments, the foot portions 115a-b may be treated to a third hardness. The third hardness may be greater than the first hardness and the same or less than the second hardness, such as about Rc 49 to Rc 56 (e.g., Rc 53).

In other embodiments, the entire formed wire rivet 100 may be treated to the same hardness, such as a hardness of about Rc 49 to Rc 56 (e.g., Rc 53).

FIG. 2A illustrates a partial exploded view of a saw chain 200 including a plurality of formed wire tie straps 100 in accordance with various embodiments. The saw chain 200 includes cutter links 216, drive links 218, and opposing tie straps 220. The shoulders 110 of the rivets 108 of formed wire tie strap 100 may be disposed in respective rivet holes 224 of the drive links 218. The hubs 112 of rivets 108 may be disposed in respective rivet holes 222 of the cutter link 216. Additionally, the hubs 112 of another formed wire tie strap 100 are disposed in respective rivet holes 226 of the opposing tie strap 220.

Figure 2B:
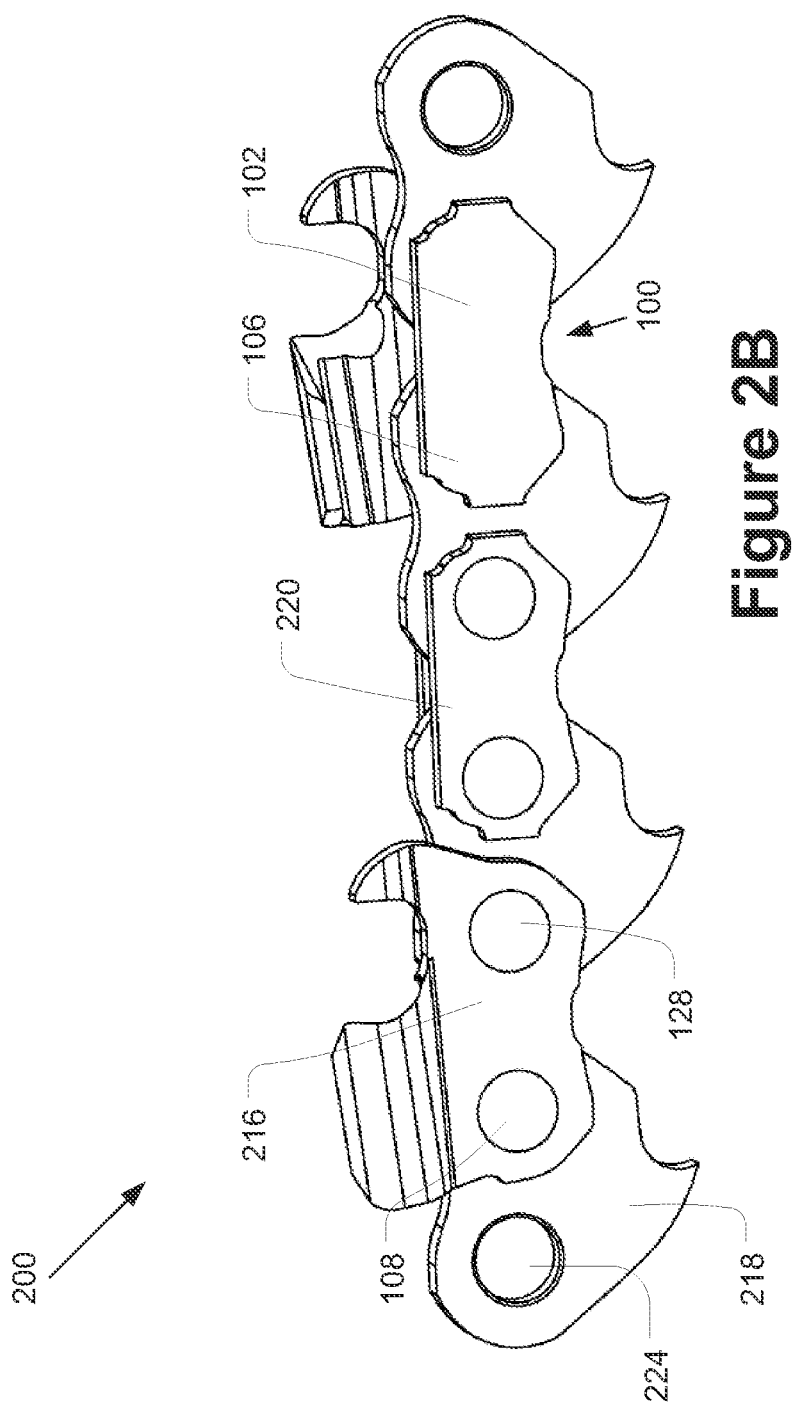
FIG. 2B illustrates a view of the saw chain of FIG. 2A, with the ends of the rivets of the formed wire tie straps formed into rivet heads, in accordance with various embodiments.

In some embodiments, the hubs 112 may be spun to form rivet heads after being placed through the respective rivet holes. For example, FIG. 2B illustrates the saw chain 200 after the hubs 112 have been spun to form rivet heads 128 on the ends of rivets 108. The rivet heads 128 may have a diameter that is greater than the diameter of the hub. In other embodiments, the rivet heads 128 may be formed by other means, such as by crushing the end of the rivet and/or striking a strike hole in the end of the rivet. Alternatively, the formed wire tie straps 100 may not include rivet heads. For example, the hubs 112 may be welded to the respective rivet holes of the opposing tie strap or cutter link.

Figure 3A:
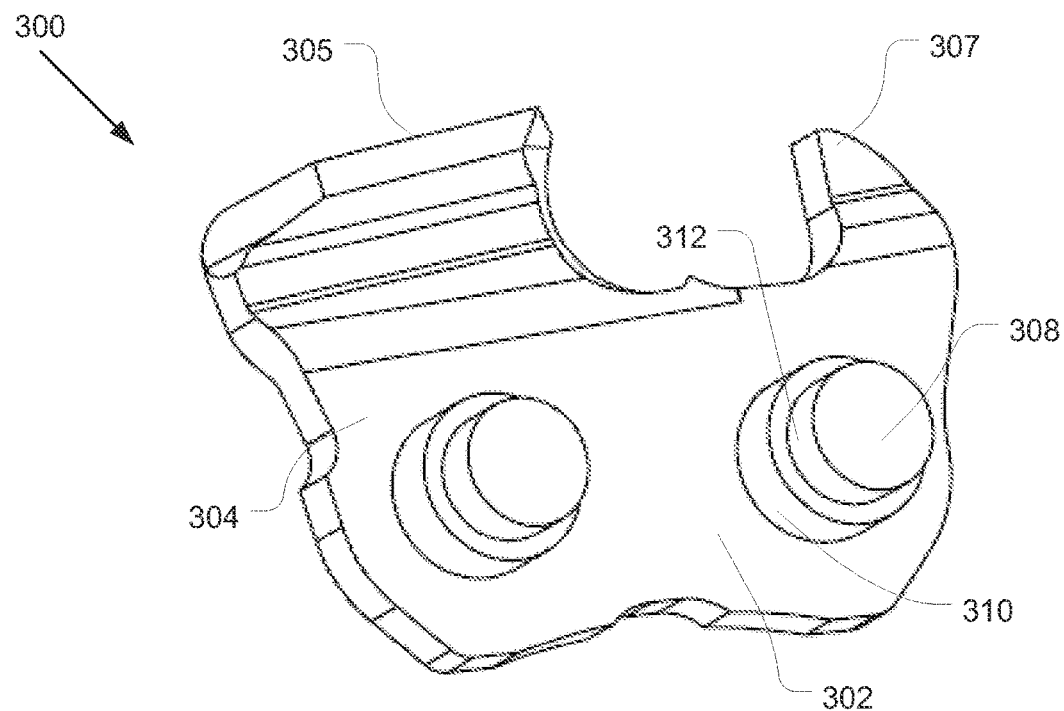
FIG. 3A illustrates a perspective view of a formed wire cutter tie strap in accordance with various embodiments.
Figure 3B:
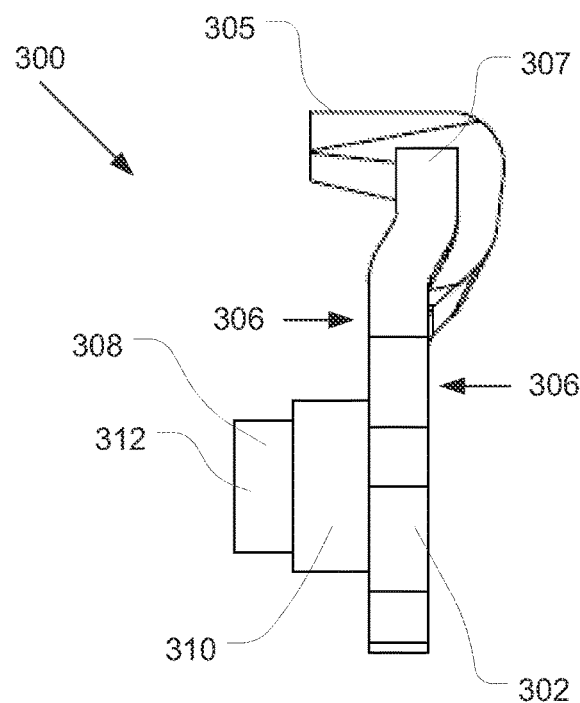
FIG. 3B illustrates a view of the formed wire cutter tie strap of FIG. 3A, in accordance with various embodiments.

FIGS. 3A and 3B illustrate a formed wire cutter tie strap 300 in accordance with various embodiments. The formed wire cutter tie strap 300 includes a body 302 having a first side 304 and second side 306 that are substantially flat. The formed wire cutter tie strap includes a cutting element 305 and a depth gauge 307 extending upward from the body 302. The formed wire cutter tie strap 300 further includes two integrated rivets 308 extending from the first side 304 of the body 302. The rivets 308 include a shoulder 310 and a hub 312. The shoulder 310 is disposed between the body 302 and the hub 312, and has a diameter that is larger than a diameter of the hub.

Figure 4A:
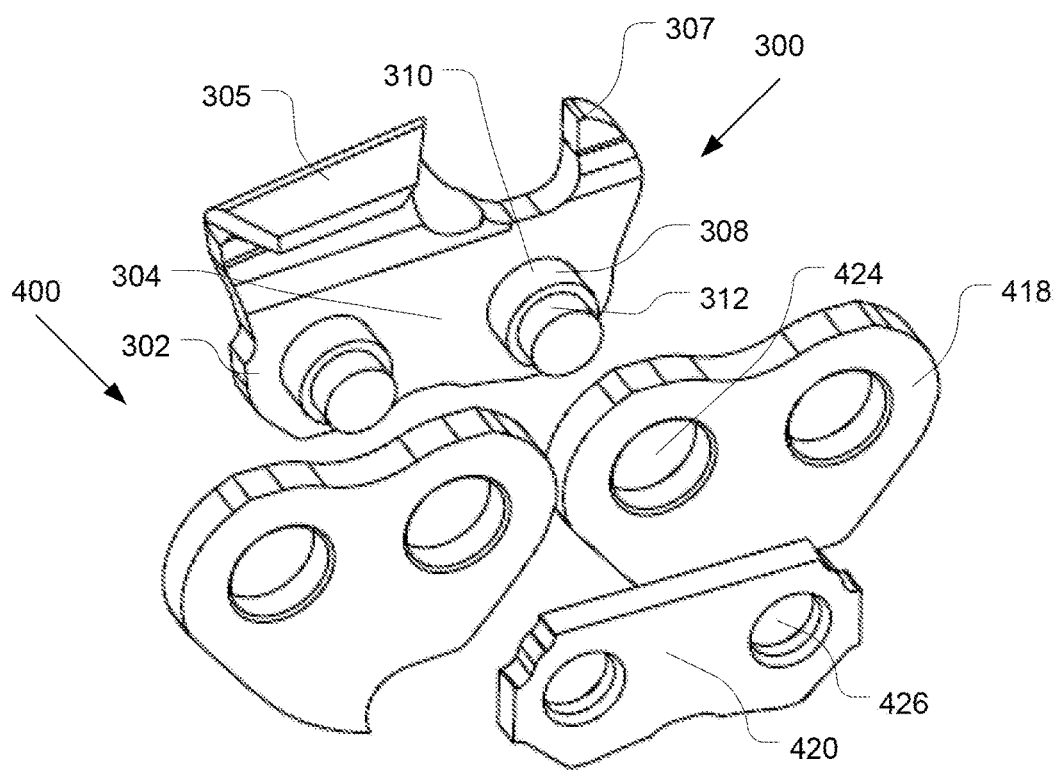
FIG. 4A illustrates an exploded view of a saw chain including the formed wire cutter tie strap of FIG. 3A, in accordance with various embodiments.
Figure 4B:
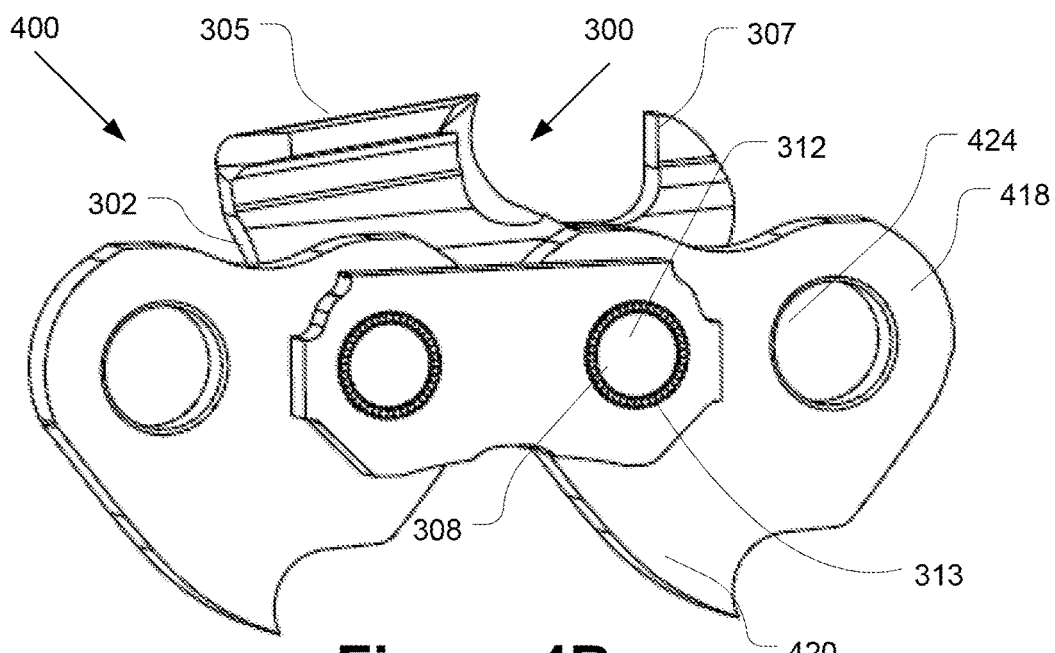
FIG. 4B illustrates a view of the saw chain of FIG. 4A with the rivets of the formed wire cutter tie strap welded to the opposing tie strap, in accordance with various embodiments.

FIGS. 4A and 4B illustrate a saw chain 400 that includes the formed wire cutter tie strap 300. The saw chain 400 further includes drive links 418 and opposing tie strap 420. The shoulders 310 of the rivets 308 are disposed in respective rivet holes 424 of the drive links 418, and the hubs 312 are disposed in respective rivet holes 426 of the opposing tie strap 420.

FIG. 4B illustrates the saw chain 400 with the hubs 312 welded to the opposing tie strap 420 via rivet holes 426 and welds 313. In other embodiments, the ends of the rivets 308 may be formed into rivet heads to secure the formed wire tie strap 300 to the opposing tie strap 420.

Figure 5A:
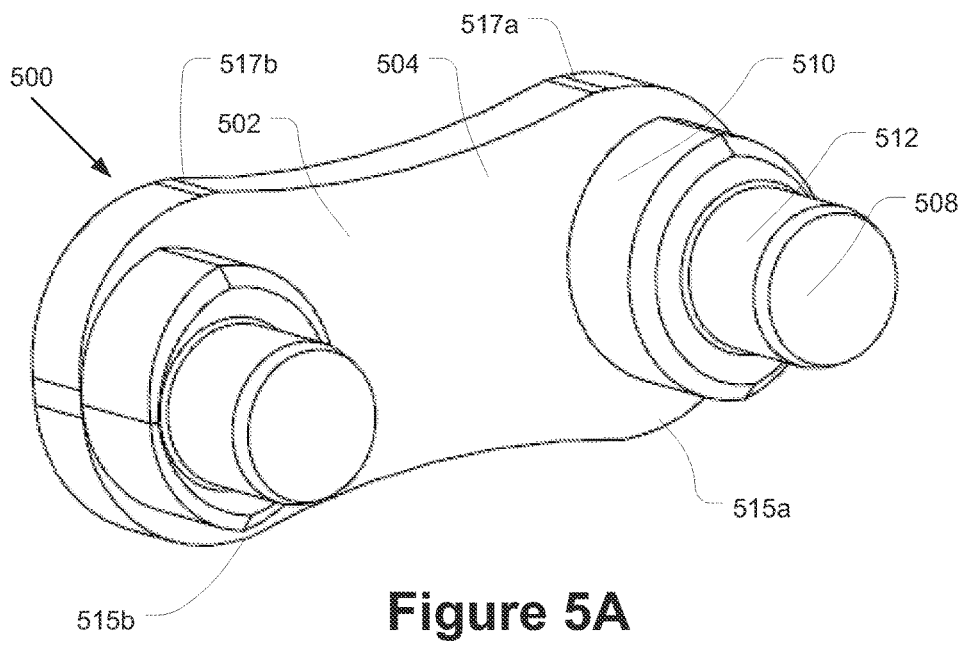
FIG. 5A illustrates a perspective view of a formed wire tie strap in accordance with various embodiments.
Figure 5B:
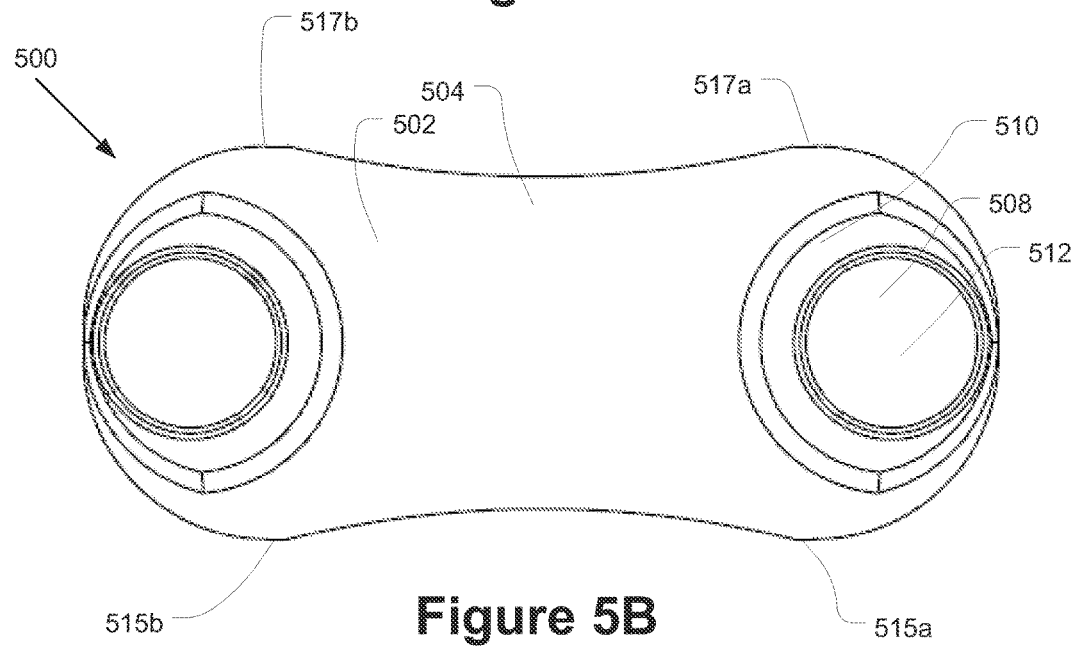
FIG. 5B illustrates a view of the formed wire tie strap of FIG. 5A.

FIGS. 5A and 5B illustrate another formed wire tie strap 500 in accordance with various embodiments. Formed wire tie strap 500 includes a body 502 with rivets 508 extending from the body. The rivets 508 include a shoulder 510 and a hub 512. The shoulder 510 and hub 512 of rivet 508 are not concentric. Rather, the center of the hubs 512 is disposed closer to the ends of the body 502 than the center of the shoulders 510. In other embodiments, the center of the hubs may be disposed closer to the middle of the body than the center of the shoulders. The formed wire tie strap 500 with nonconcentric shoulder 510 and hub 512 may allow more flexibility in the design of the saw chain, including the design and/or arrangement of the connecting links (e.g., drive links) and opposing tie straps.

Additionally, the shoulders 510 have a non-circular cross section. For example, the shoulders 510 are shown in FIGS. 5A-5B a football-shaped cross section. In other embodiments, the shoulders 510 may have any other suitable cross-sectional shape.

The tie strap 500 further includes foot portions 515a-b on a bottom surface of the body 502. The foot portions 515a-b may ride on a rail of a chain saw guide bar (not shown). In some embodiments, the tie strap 500 may further include foot portions 517a-b on a top surface of the body 502. For example, the tie strap 500 is symmetrical about a horizontal axis through the rivets 508. This may allow the tie strap 500 to have a reversible orientation to facilitate assembly of the saw chain.

Figure 6A:
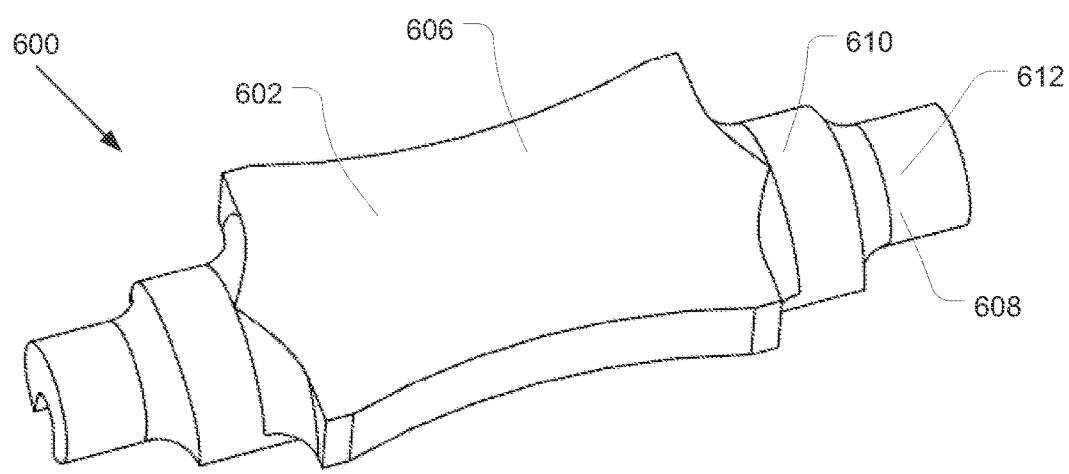
FIG. 6A illustrates a view of a partially manufactured formed wire tie strap in accordance with various embodiments.
Figure 6B:
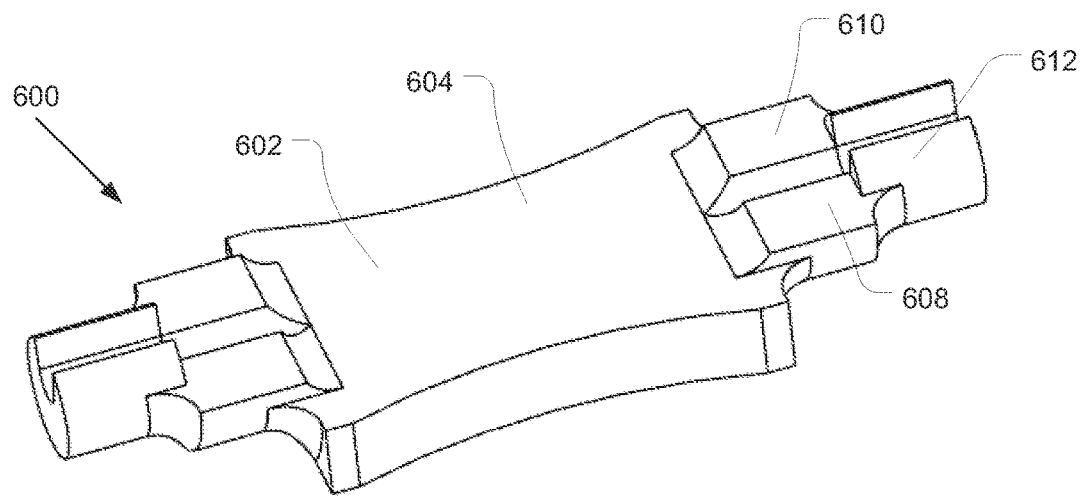
FIG. 6B illustrates a view of the partially manufactured formed wire tie strap of FIG. 6A.

FIGS. 6A and 6B illustrate a partially manufactured formed wire tie strap 600. The formed wire tie strap 600 may be formed from a rectangular strip of material (e.g., steel). The material may form a substantially flat body 602, with a first side 604 and a second side 606. The rivets 608 may be formed while in the horizontal orientation shown in FIGS. 6A and 6B. The rivets 608 include a shoulder 610 and a hub 612. In an embodiment, a cutter element (such as shown in FIGS. 3A, 3B, 4A, and 4B) may be formed extending up from body 602.

The shoulder 610 and hub 612 have a partially-circular cross section (e.g., less than a full circle). This may facilitate manufacturing of the formed wire tie strap 600 and/or reduce the material used or weight of the tie strap 600. In some embodiments, the cross-sections of the shoulder 610 and hub 612 may be a different angular portion of a circle. For example, as shown the shoulder 610 has a cross-section that approximates a semi-circle, and the hub 612 has a "c-shaped" cross-section that is greater than a semi-circle and less than a full circle.

Figure 6C:
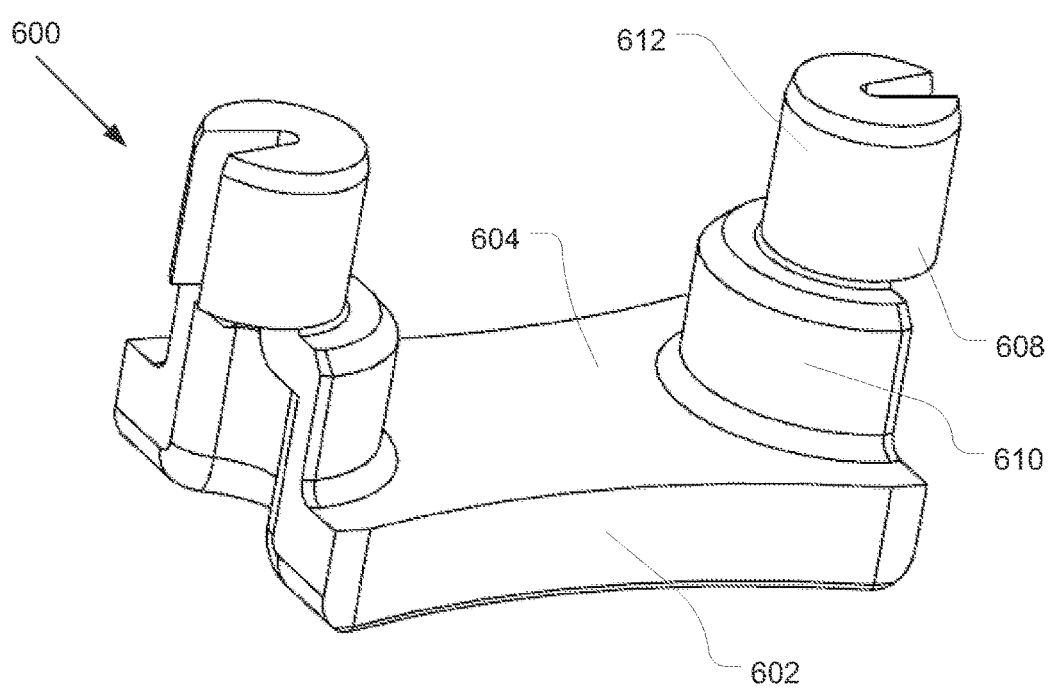
FIG. 6C illustrates a perspective view of the partially manufactured formed wire tie strap of FIGS. 6A and 6B after another manufacturing operation.

In a subsequent operation, the rivets 608 may be bent with respect to the body 602 (e.g., to be perpendicular to the body 602). The resulting rivet 600 is shown in FIG. 6C.

Figure 7A:
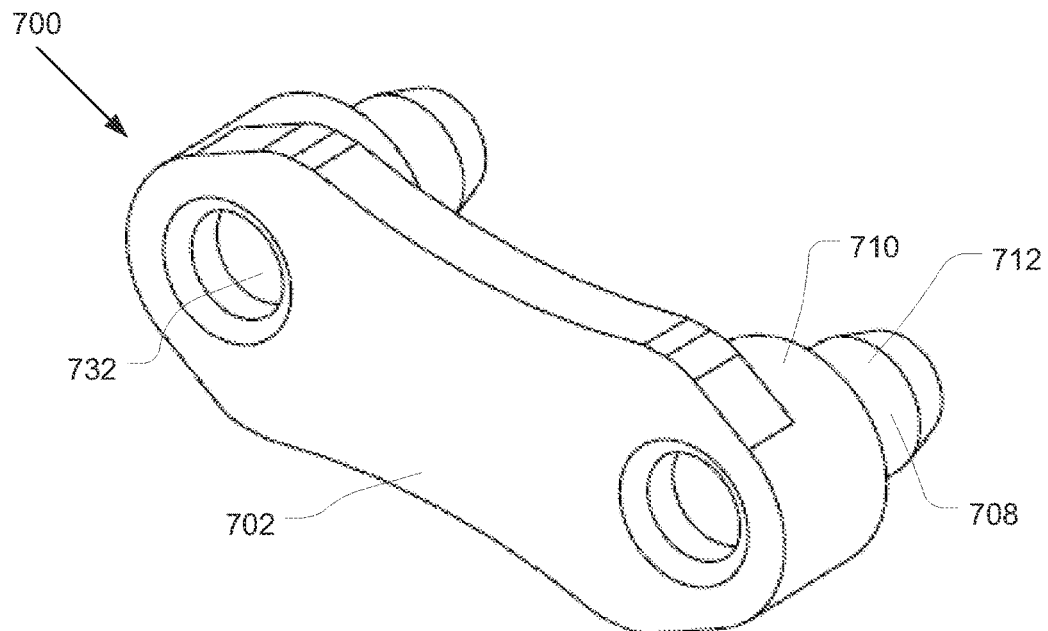
FIG. 7A illustrates a perspective view of a formed wire tie strap in accordance with various embodiments.
Figure 7B:
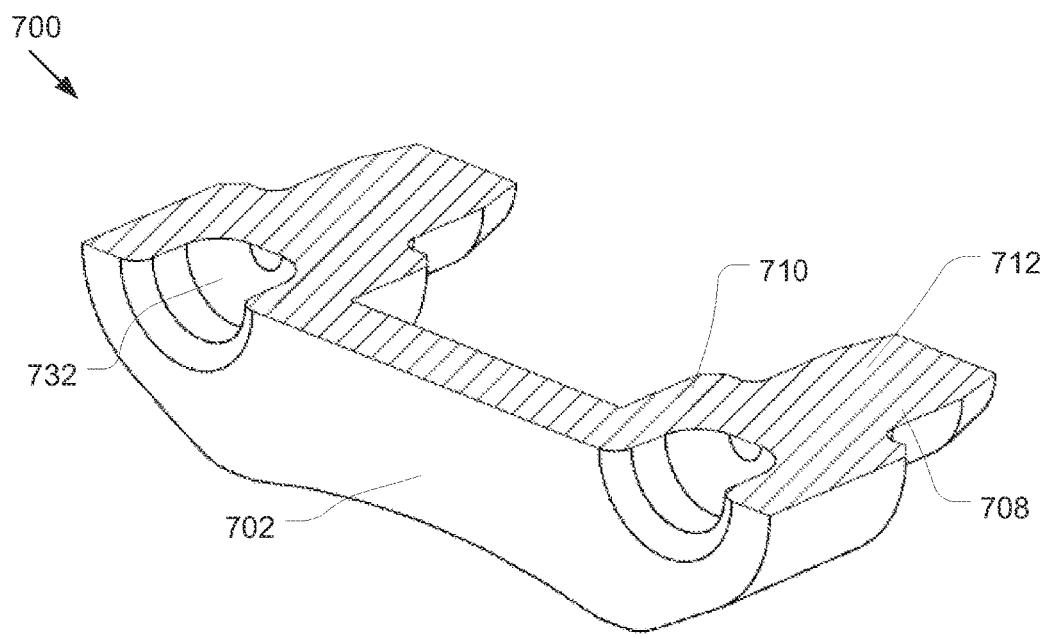
FIG. 7B illustrates a cross-sectional view of the formed wire tie strap of FIG. 7A.

FIGS. 7A and 7B illustrate another embodiment of a formed wire tie strap 700. Formed wire tie strap 700 has a body 702 with rivets 708 extending from the body 702. The rivets 708 have a shoulder 710 and a rivet head 712. The formed wire tie strap 700 may further include an opening 732 through the body 702 at a proximal end of the rivet 708. In some embodiments, the opening 732 may extend all the way though the rivet 708. The opening 732 may be preformed to facilitate fabrication of the formed wire tie strap 700.

Figure 8:
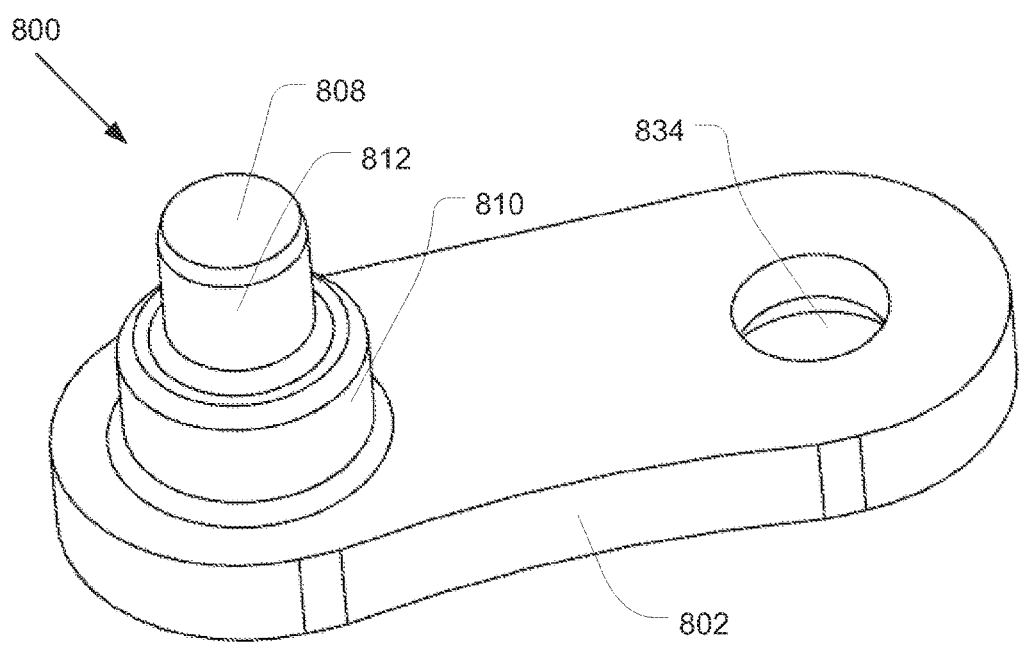
FIG. 8 illustrates a formed wire tie strap with an integrated rivet and a rivet hole, in accordance with various embodiments.

FIG. 8 illustrates another embodiment of a formed wire tie strap 800. Formed wire tie strap 800 includes a body 802 with a single rivet 808 extending from a first end of the body 802 and a rivet hole 834 disposed in a second end of the body 802. The rivet 808 includes a shoulder 810 and a hub 812.

The formed wire tie strap 800 may be coupled with another formed wire tie strap 800 in a saw chain (not shown). The hub 812 of each formed wire tie strap 800 may be disposed in the rivet hole 834 of the other formed wire tie strap 800. The shoulders 810 of the respective formed wire tie straps 800 may provide a gap between the formed wire tie straps 800. A pair of connecting links (e.g., drive links, not shown) may be coupled together by the pair of formed wire tie straps 800. The shoulders 810 of the rivets 808 may be disposed in respective rivet holes of the connecting links.

Figure 9:
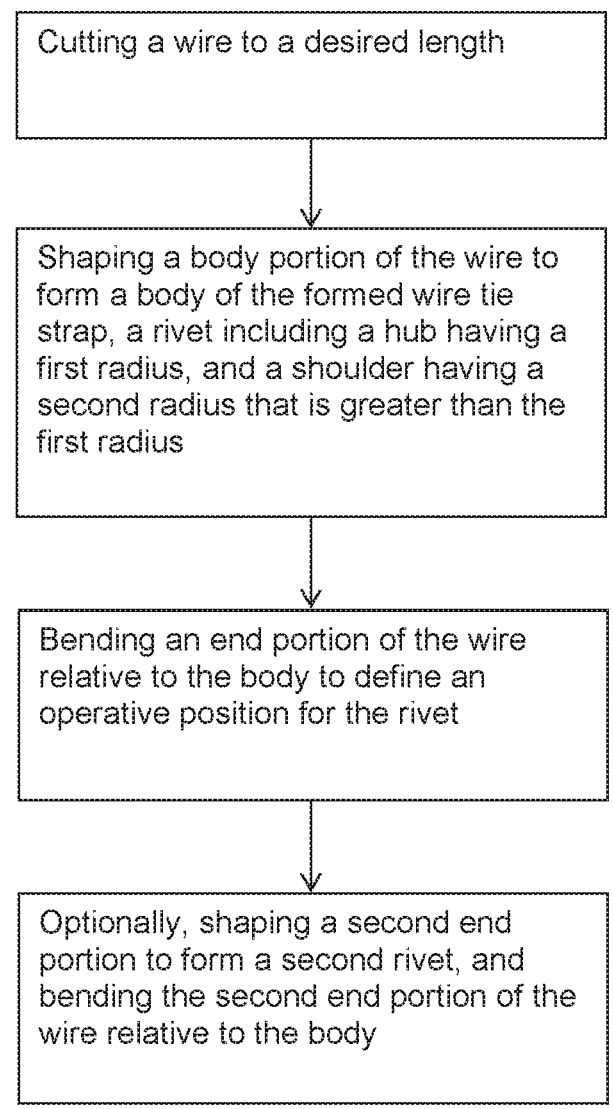
FIG. 9 is a flow diagram showing a method for fabricating a formed wire tie strap, in accordance with embodiments herein.

FIG. 9 illustrates an exemplary method of fabricating a formed wire tie strap, in accordance with embodiments herein. The method includes the steps of: cutting a wire to a desired length; shaping a body portion of the wire to form a body of the formed wire tie strap, a rivet including a hub having a first radius, and a shoulder having a second radius that is greater than the first radius; bending an end portion of the wire relative to the body to define an operative position for the rivet; and optionally, shaping a second end portion to form a second rivet, and bending the second end portion of the wire relative to the body.

Figure 10:
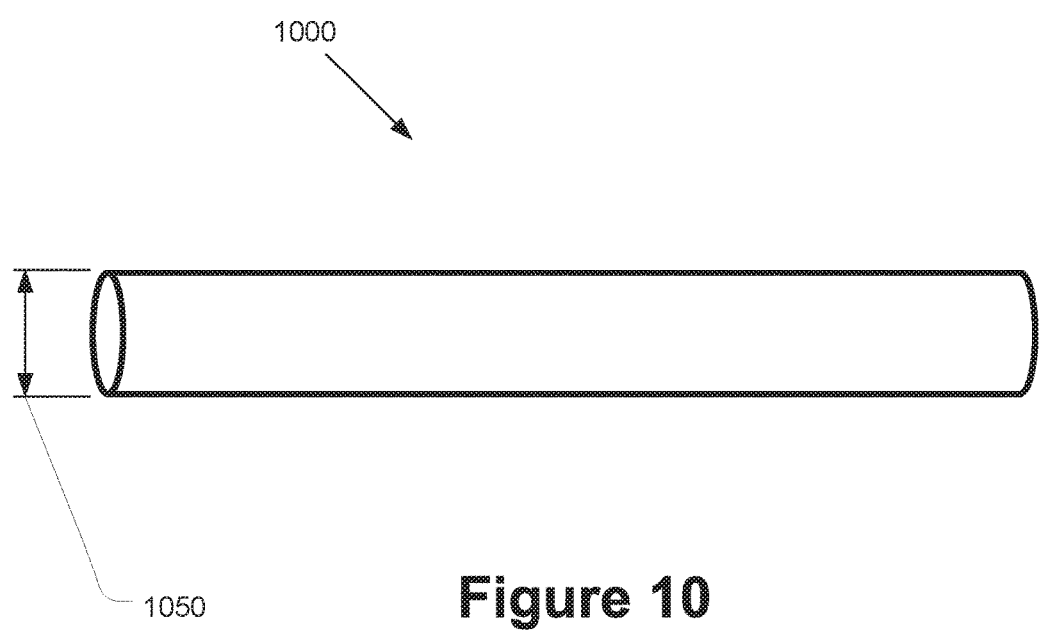
FIG. 10 is a perspective view of a substantially cylindrical wire, in accordance with embodiments herein.

FIG. 10 illustrates a substantially cylindrical wire 1000 used to make a formed wire tie strap. The wire 1000 may have a starting diameter 1050 that is substantially equal to the diameter of the hub of the formed wire tie strap.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of fabricating a formed wire tie strap for saw chain with one or more integrated rivets, comprising:
   cutting a wire to a desired length;
   shaping a body portion of the wire to form a body of the formed wire tie strap, and shaping an end portion of the wire to form a rivet including a non-threaded hub having a first radius with a shoulder having a second radius that is greater than the first radius; and
   subsequent to shaping the end portion and shaping the body portion, bending the end portion of the wire relative to the body to define an operative position for the rivet.

2. The method of claim 1, further comprising expanding a distal end of the end portion to form a rivet head.

3. The method of claim 1, further comprising welding the hub to an opposing tie strap.

4. The method of claim 1, wherein the end portion is a first end portion and the rivet is a first rivet, and wherein the method further includes:
   shaping a second end portion to form a second rivet; and
   subsequent to shaping the second end portion, bending the second end portion of the wire relative to the body.

5. The method of claim 1, further comprising:
   treating the formed wire tie strap to a first hardness;
   treating the shoulder to a second hardness that is greater than the first hardness; and
   treating a foot portion of the formed wire tie strap to a third hardness that is greater than the first hardness and equal to or less than the second hardness.

6. The method of claim 5, wherein the first hardness is about Rc 30 to Rc 40 and the second hardness is about RC 56 to RC 62.

7. The method of claim 1, further comprising:
   treating the formed wire tie strap to a first hardness; and
   welding the rivet of the formed wire tie strap with the first hardness to an opposing tie strap.

8. The method of claim 7, wherein the first hardness is about Rc 49 to Rc 56.

9. The method of claim 1, further comprising forming a cutting element extending up from the body.

\* \* \* \* \*